S. J. FISH.
EGG TESTING MACHINE.
APPLICATION FILED DEC. 13, 1911.

1,040,919.

Patented Oct. 8, 1912.

2 SHEETS—SHEET 1.

Witnesses

S. J. Fish, Inventor by C. A. Snow & Co., Attorneys

S. J. FISH.
EGG TESTING MACHINE.
APPLICATION FILED DEC. 13, 1911.

1,040,919.

Patented Oct. 8, 1912.

2 SHEETS—SHEET 2.

Witnesses

S. J. Fish, Inventor by C. A. Snow & Co., Attorneys

UNITED STATES PATENT OFFICE.

SQUIRE J. FISH, OF JACKSON, MICHIGAN.

EGG-TESTING MACHINE.

1,040,919.  Specification of Letters Patent.  Patented Oct. 8, 1912.

Application filed December 13, 1911. Serial No. 665,503.

*To all whom it may concern:*

Be it known that I, SQUIRE J. FISH, a citizen of the United States, residing at Jackson, in the county of Jackson and State of Michigan, have invented a new and useful Egg-Testing Machine, of which the following is a specification.

This invention relates to improvements in egg testing machines, the primary object of the invention being the provision of a machine containing a normally open electric lighting circuit, in which the illuminator is so disposed as to have interposed between it and a sight aperture or confiner, an egg carrier with a plurality of holders adapted each to contain an egg, the said egg to be disposed between the illuminator and the sight aperture, said carrier being provided with a circuit closing means, whereby the circuit is energized successively or intermittently to cause the rays of light from each illuminator to be projected to give the desired transparency to the egg in what is known as candling eggs, or testing the same to sort out the fresh from the bad ones.

A further object of the invention is the provision of an egg testing machine having a frame carrying a normally opened illuminating circuit, in combination with an endless carrier provided with a plurality of egg holders and with a circuit closing means, whereby as the eggs are disposed into testing or candling position, the circuit is successively or intermittently energized and the eggs illuminated one at a time so as to produce the desired transparency in assorting the eggs.

A still further object of the present invention is the provision of a daylight candling or testing device, which may be readily used without the necessity of using the same in a dark room, the same being provided with an electrical means, whereby the trays carrying the eggs will close or energize the circuit during the testing or candling of the eggs.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
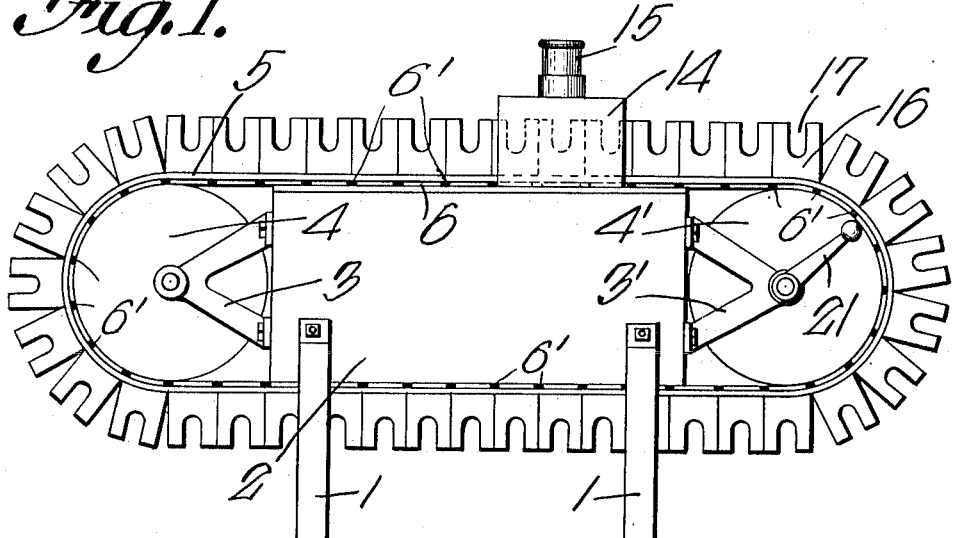
Figure 2:
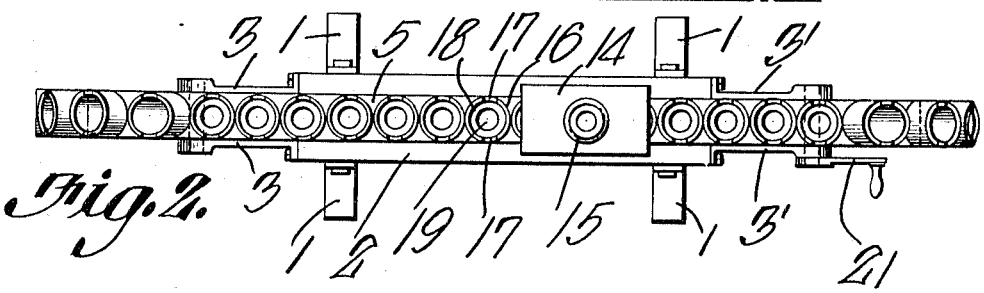
Figure 5:
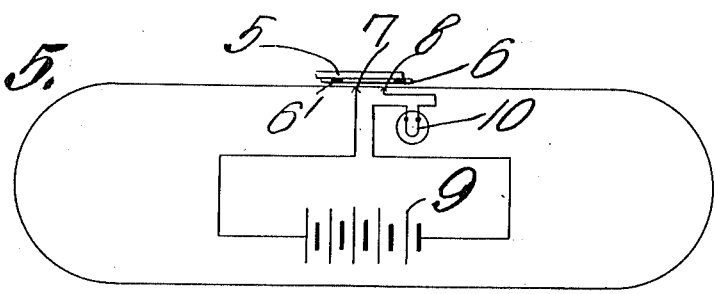
Figure 3:
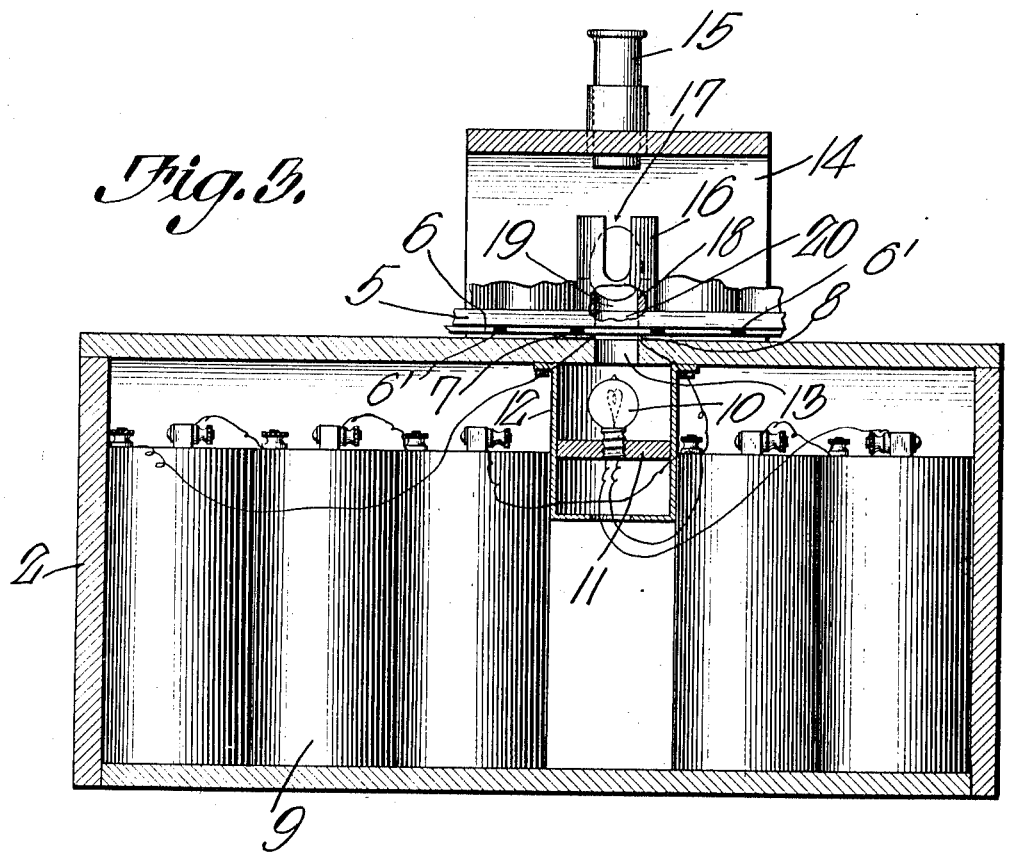
Figure 4:
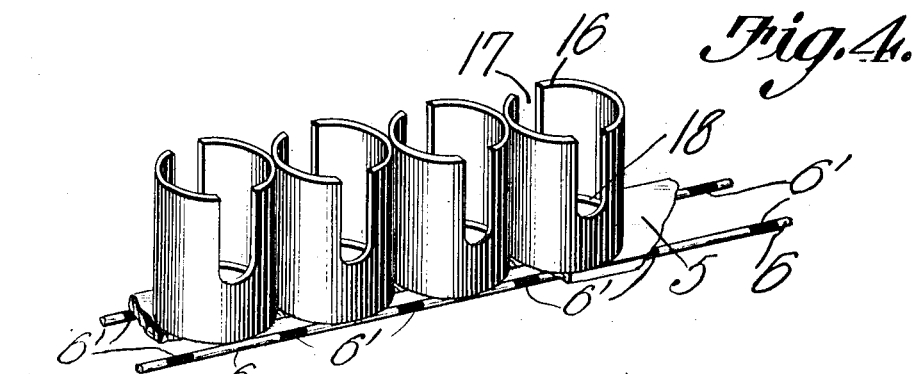

In the drawings—Figure 1 is a side elevation of the complete egg testing machine. Fig. 2 is a top plan view thereof. Fig. 3 is a longitudinal sectional view through the battery box and light confining tunnel of the machine, which in itself will constitute a small machine, while the machine, as shown in Figs. 1 and 2, is designed for testing and candling eggs in larger quantities. Fig. 4 is a perspective view of a plurality of the egg holders and the adjacent portions of the carrier, portions of the carrier being broken away to show the circuit closers carried thereby. Fig. 5 is a diagrammatic view of the lighting circuit.

Referring to the drawings, the numeral 1 designates the supports, which carry the battery box or main casing 2 of the machine. In the form shown in Figs. 1 and 2 journal brackets 3 and 3' are connected to and projected from opposite ends thereof and carry the respective wheels 4 and 4'.

Mounted so as to pass above the upper surface of the box 2 and below the same and around the respective wheels 4 and 4' is an endless conveyer 5 which has connected thereto alternating bridging conductors 6 and blocks 6' of insulation, the bridging conductors being so disposed as to rest upon the respective contact points 7 and 8 of the electrical circuit, when the egg is directly above the lamp 10, as shown in Fig. 5, so as to close the circuit through the batteries 9 and the lamp 10 to produce the desired illumination for testing or candling the eggs, one at a time. This lamp 10, as clearly shown in Fig. 3 is removably mounted in the support 11 disposed in the compartment 12 formed preferably by a tube within the chamber or casing 2, the same being carried by the top thereof so that the lamp 10 will be disposed directly below the aperture 13 in the top of the casing or chamber 2. By this means the rays of light from the lamp will be projected through said aperture 13.

Connected to the top of the chamber or casing 2 upon each side thereof and extending equi-distantly from the center of the aperture 13 is a light confining chamber or tunnel 14 provided with the sight tube or sleeve 15 which is disposed to be in vertical alinement with the aperture 13 and lamp 10. By this means the rays of light from the lamp 10 will be observable directly through the tube or sleeve 15, when the circuit is closed or bridged by the circuit closing metal wire or conductor 6 of the egg carrier 5. The sleeve 15 may have a lens.

Secured to the carrier belt 5 are a plurality of egg holders 16 each one of which is cylindrical in form and open at its upper end and provided with the diametrically disposed slots 17, whereby the egg may be readily placed within the holder or removed therefrom. Disposed in the bottom of the respective holders 16 is a cup shaped ring 18 provided with an aperture 19 which is in alinement with the aperture 20 of the carrier belt 5. By this construction it will be seen that when the holder 16 is in the position shown in Fig. 3 the conductor wire 6 will have bridged the points 7 and 8 closing the illuminating circuit so that the energized lamp 10 will have the rays thereof, projected through the apertures 13 and 20, to the egg within the holder 16 and that the party testing the eggs by sighting through the tube or sleeve 15 will see at a glance the condition of the egg, such condition being readily observable, due to the transparency of the egg.

By this construction the defects within the egg are made more readily discernible so that a very rapid handling of the egg is permitted, and with a device as shown in Figs. 1 and 2 the eggs may be placed within the holder at the left thereof and by the manipulation of the crank or handle 21 may be moved in the direction of the arrow where they may be either removed at the extreme right end manually, or fed by gravity to crates.

Where a device is used employing simply the battery box and portions illustrated in Fig. 3, the carrier portion 5 is a single strip of material carrying in the neighborhood of half a dozen of the holders 16 so that the candling of eggs may be done on a smaller scale, yet in a thoroughly satisfactory manner.

With this form of apparatus eggs may be candled or tested in daylight, as the peculiar arrangement of the illuminator 10, tunnel 14 and the egg carrier and circuit maker, provide a confining means for the rays of light so that the exterior light rays will have no detrimental effects in making such tests. By positioning the slots 17 so as to open toward the closed portion of the tunnel that is toward the side walls thereof, the rays of light coming through the open ends of the tunnel will be excluded from the holders 16 so as not to in any way detrimentally effect the operation of the machine.

What is claimed is:

1. An egg testing machine, having an open electrical lighting circuit, egg holders and a slidable circuit closer one to each egg holder carried by the holders.

2. An egg testing machine, having an open electrical lighting circuit, a slidable egg carrier having an egg holder with a sight aperture to aline with the light of the lighting circuit, and a circuit closer carried by the carrier to successively open and close the circuit for each egg holder to energize the light.

3. An egg testing machine, having a normally open electrical circuit including an illuminator, and a movable egg tray and circuit closer disposed to successively open and close the circuit as the egg tray disposes an egg above the illuminator.

4. An egg tester, having a frame, a normally open electrical lighting circuit carried thereby, a light excluding means disposed above the light of the circuit, an observation tube carried by said means, a movable carrier mounted upon the frame, a circuit closer carried thereby, and a plurality of egg holders secured to the carrier for interposition between the light of the circuit and the observation tube, the circuit being successively opened and closed as each egg holder is presented.

5. An egg testing machine, having a casing, a normally open electric lighting circuit carried thereby, said casing being provided with an aperture disposed in alinement with the light of the circuit, a light confining tunnel connected to the casing above the aperture thereof, an observation tube connected to the tunnel in line with the aperture of the casing, and an egg carrier and circuit closer disposed for passage through the tunnel to interpose the eggs between the aperture of the casing and the observation tube and simultaneously energize the lighting circuit, said circuit being opened and closed successively during the passage of the carrier and circuit closer.

6. An egg testing machine, having a casing, a normally open electric lighting circuit carried thereby, said casing being provided with an aperture disposed in alinement with the light of the circuit, a light confining tunnel connected to the casing above the aperture thereof, an observation tube connected to the tunnel in line with the aperture of the casing, an egg carrier and circuit closer disposed for passage through the tunnel to interpose the eggs between the aperture of the casing and the observation tube and simultaneously energize the lighting circuit, and a plurality of individual egg holders mounted upon said carrier and open at both ends, whereby one at a time of said holders is disposed in line with the aperture of the casing and the observation tube to interpose the eggs carried thereby between the light of the circuit and the observation tube and to energize the circuit one for each egg holder.

7. An egg testing machine, having a supporting frame, a source of electrical energy, a normally open electrical circuit including said source, a lamp in said circuit, a slidable egg holder having a plurality of egg cups with apertures to register with the lamp, and a circuit closer carried bodily by the holder for closing the circuit when the holder is in a presentation position.

In testimony that I claim the foregoing as my own, I have hereto affixed my signature in the presence of two witnesses.

SQUIRE J. FISH.

Witnesses:
B. E. BEGEL,
CLYDE M. MCGUFFIN.